Patented Oct. 6, 1953

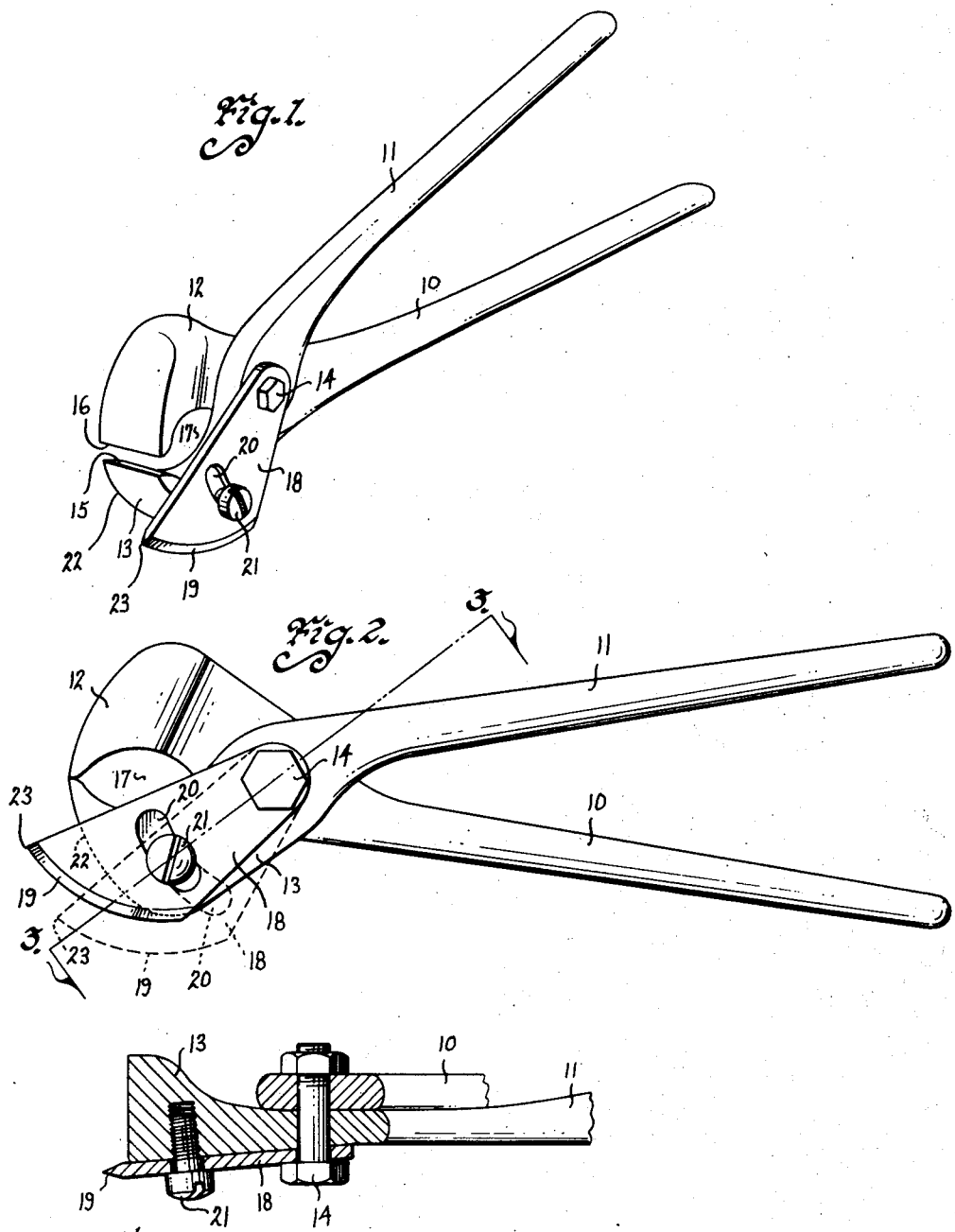

2,654,120

UNITED STATES PATENT OFFICE 2,654,120

FISH SKINNING TOOL

Gordon A. Tifft, Marshalltown, Iowa

Application July 7, 1951, Serial No. 235,583

1 Claim. (Cl. 17—7)

1

My invention relates to a fish skinning tool.

In the art of fish skinning whether done commercially or for sport, at least two operations are usually required. First, the skin must be loosened around the base of the head and secondly, the skin must be removed. Also, if desired, the neck is broken below the head so that the head may be removed. For these operations it is customary to use a sharp bladed instrument for cutting the skin loose and a pincer type tool for gripping the loosened end of the skin for the purpose of removing it. Consequently, a person engaged in skinning fish for a livelihood who performs this task hour after hour will pick up and lay down the respective cutting and removing tools countless times. Inevitably during this process one or both of the tools will not only become imbedded in and temporarily lost amongst the fish bodies and skins but also become greasy and slippery to handle, all of which consumes time in locating the tool and cleaning it so that the efficiency of the worker is adversely affected to a certain extent.

With these problems in mind, it is the general aim of my invention to provide a fish skinning tool having in one unit a cutting member and gripping member whereby the skinning of a fish can be accomplished with one instrument and without removing the instrument from the hand of the user.

A further object of this invention is to provide a fish skinning tool of the above class where the combining of the cutting and gripping member cooperate to form a depth gauge feature for limiting the depth of penetration of the cutting member into the carcass of the fish.

A still further object of my invention is to provide a tool having the characteristic described above wherein the cutting member is adjustable to provide the proper depth of cut as the sharpened end may become worn from resharpenings.

Still another object of this invention is to provide a fish skinning tool as described wherein the gripping member is of the pincer type having a small open jaw area when the tool is closed to provide a squeezing or pressing action rather than a cutting and pincing effect when used for gripping a fish carcass.

Still other objects of my invention are to provide a fishing skinning tool of the above classes that is economical in manufacture, efficient in use and durable in construction.

These and other objects will be apparent to those skilled in the art.

My invention consists in the construction, arrangement, and combination of the various parts of the device, whereby the objects contemplated are attained as hereinafter more fully set forth, pointed out in my claim, and illustrated in the accompanying drawings, in which:

Fig. 1 is a perspective view of my fish skinning tool ready for use,

Fig. 2 is an enlarged side elevational view of this invention showing the adjustability of the cutting member, and Fig. 3 is a cross-sectional view of this tool taken on the line 3—3 of Fig. 2.

Referring to the drawings and particularly to Fig. 1 my fish skinning tool has the general appearance of a pair of pincers having the handles 10 and 11 with their respective integral jaws 12 and 13 that are movable on a pivot provided by the bolt and nut 14. No invention is claimed in this general construction which is common for many type gripping tools. The engaging edges 15 and 16 of the jaws are relatively flat and substantially parallel when in engagement with each other so that when they are used to engage the edge of a fish skin they will provide a greater bearing surface than the usual tapered edges of pincers used for cutting nails and the like and thus by my construction the danger to tearing or cutting the fish skin is eliminated. The open portion 17 between the jaws is relatively small as shown in Fig. 1 and this is of importance when this tool is used for gripping the carcass in removing the head as will be later described.

An elongated flat cutting member 18 that is preferably tapered inwardly from front to rear is pivotally secured at its rear or narrow end on the outside of the handle 11 and jaw 13 at the pivot point 14. The forwardly portion of the member 18 lies flush on the jaw and extends forwardly and outwardly therefrom. The forward edge 19 of the blade 18 is sharpened to provide a cutting edge and is arcuate as illustrated in Fig. 2.

A transverse slot 20 is formed in the blade 18 between its ends and a set screw 21 threaded into the jaw 13 is engageable with the blade at this point. The slot is curved slightly to conform generally with the curvature of the outer edge 22 of the jaw 13 and by setting the blade 18 at different points along the slot 20 the distance between the cutting edge 19 and the outer edge 22 of the jaw 13 will be lesser or greater depending upon whether the blade is moved toward or away from the jaw portions 15 and 16.

Thus constructed and arranged my new tool can be used in the following manner. The blade 18 when newly made will be moved toward the jaw ends 15 and 16 as far as the slot 20 will permit as illustrated in Fig. 1. Thus positioned, the most forwardly point 23 on the cutting edge 19, which is the portion of the blade that performs substantially all of the cutting, will be spaced forwardly of the edge 22 of the jaw 13 at the proper distance therefrom for use. The distance between the points 23 and 22 is a matter that can easily be determined by one skilled in the art when making the blade. Thus set, as the tool is used to cut the skin loose about the neck of the fish, the edge 22 of the jaw 13 serves as a stop or guide to limit the penetration of the point 23 and is a safeguard against mutilation of the carcass. In performing the cut, this tool is held the same as a pair of pincers or pliers. As the blade is sharpened and resharpened, it will of course lose some of its length and therefore to maintain the point 23 at the proper distance from the edge 22, the set screw 21 is loosened and the blade moved outwardly away from the jaws 15 and 16 as shown by the broken lines in Fig. 2. This will increase the distance between points 23 and 22 and compensate for any length of the blade lost in grinding. When the new desired position is found, the screw 21 can be tightened.

It is pointed out that in using this tool it is not necessary to lay it down between the different operations since the one tool combines both the cutting edge and gripping element. After the neck of the fish has been ringed or cut, the loose skin edge is gripped by the edges 15 and 16 of this tool and removed. In addition to cutting and removing the skin, this tool is especially adapted for use in removing the fish head. For this task the fish is usually gripped behind the head with a tool and the neck bone is broken by using the free hand to snap the head and remove it. Care must be taken when doing this lest the gripping tool cut and mutilate the meat on the carcass. Consequently, for this purpose I have provided the relative small opening 17 between the jaws. This permits the tool to be applied to the skinned carcass and to hold it by a pressing or squeezing action that reduces the mutilation of the meat to a minimum.

Some changes may be made in the construction and arrangement of my fish skinner without departing from the real spirit and purpose of my invention, and it is my intention to cover by my claim, any modified forms of structure or use of mechanical equivalents which may be reasonably included within their scope.

I claim:

In a fish skinning tool, a pincer-like tool having a pair of handle members with integral jaw portions that are movable on a pivot, a cutting blade flush with the side of one jaw portion and pivotally secured at one end to the pivot point of said tool, said blade having a cutting edge extending forwardly of said adjacent jaw portion, whereby when the said jaw portions are clamped on a portion of the skin of a fish, the forward end of the tool will be thus held and by raising the handle members the blade will penetrate and cut into the fish being processed, the outer edge of said jaw portion adjacent said cutting blade also serving as a stop means to limit the depth of penetration of said blade in a fish carcass, and means for adjusting the depth of cut of said blade.

GORDON A. TIFFT.

References Cited in the file of this patent

UNITED STATES PATENTS

| Number | Name | Date |
| --- | --- | --- |
| 715,988 | Cooley et al. | Dec. 16, 1902 |
| 1,171,241 | Potter | Feb. 8, 1916 |
| 1,459,007 | Wetzig | June 19, 1923 |
| 1,935,149 | Elvin | Nov. 14, 1933 |